United States Patent [19]

Ide

[11] Patent Number: 4,704,039

[45] Date of Patent: Nov. 3, 1987

[54] ROLLER BEARING LUBRICATING DEVICE

[75] Inventor: Nobuhiro Ide, Nagasaki, Japan

[73] Assignee: Mitsubishi Denki Kabushiki Kaisha, Tokyo, Japan

[21] Appl. No.: 806,126

[22] Filed: Dec. 9, 1985

Related U.S. Application Data

[63] Continuation of Ser. No. 576,406, Feb. 2, 1984, abandoned.

[30] Foreign Application Priority Data

Feb. 7, 1983 [JP] Japan .................... 58-16898

[51] Int. Cl.$^4$ .................... F16C 19/06; F16C 37/00
[52] U.S. Cl. .................... 384/464; 384/465
[58] Field of Search ............ 384/464, 462, 465, 467, 384/473, 476

[56] References Cited

U.S. PATENT DOCUMENTS

| 1,724,902 | 8/1929 | Bentley ............... 308/187 |
| 1,745,216 | 1/1930 | Horger ............. 308/187 X |
| 2,500,454 | 3/1950 | Evans ................ 384/464 |
| 2,568,861 | 9/1951 | Luenberger ........ 308/187 X |
| 2,902,323 | 9/1959 | Luenberger ........... 308/187 |
| 2,921,820 | 1/1960 | Eisenhart ............. 308/187 |
| 3,582,163 | 3/1969 | McKee ................ 308/187 |

FOREIGN PATENT DOCUMENTS 52-26103  2/1977  Japan .

Primary Examiner—Stuart S. Levy
Assistant Examiner—Lynn M. Sohacki
Attorney, Agent, or Firm—Wenderoth, Lind & Ponack

[57] ABSTRACT

A roller bearing lubricating device including a roller bearing for supporting a rotary shaft, a bearing housing for supporting the bearing, an oil tank provided in the housing for storing oil lubricating oil, a weir for forming an oil reservoir for dipping part of the bearing, and an oil supply passage for communicating between the tank and the reservoir with a part thereof having a predetermined minimum cross-sectional area.

8 Claims, 9 Drawing Figures

ROLLER BEARING LUBRICATING DEVICE

This application is a continuation of now abandoned application Ser. No. 576,406, filed Feb. 2, 1984.

BACKGROUND OF THE INVENTION

The present invention relates to a roller bearing lubricating device for a lateral rotary machine.

A conventional bearing lubricating device for a rotary machine of this kind is shown in FIGS. 1 and 2. In the drawings, reference numeral 1 designates a rotary shaft, reference numeral 2 designates a roller bearing which supports the rotary shaft 1, reference numerals 2a, 2b, and 2c designate an outer race, an inner race, and rollers (ball bearings), respectively, reference numeral 3 designates a bearing housing, reference numeral 4 designates an oil tank which is provided in the housing 3 and stores lubricating oil 6, and reference numeral 5 designates an oil gauge mounted in the tank 4.

The conventional lubricating device lubricates the bearing by immersing the rollers 2c of the bearing 2 directly in the lubricating oil 6 in the tank 4. In this case, the inner race 2b of the bearing 2 rotates together with the shaft 1. Thus, the rollers 2c rotate and the oil 6 is stirred due to the rotation of the rollers 2c. This stirring produces heat, oil splashes A, and waves B on the oil surface. As a result, when the rollers 2c are immersed directly in the lubricating oil in the tank 4, more oil than necessary for the purpose of lubrication is supplied to the bearing 2. When the shaft 1 is accelerated in rotation, the heat produced by stirring abruptly increases and the bearing temperature thus remarkably increases. In addition, oil splashing increases and oil leakage results. Further, surface waviness is also increased, causing great variation in the oil surface level, and as a result the gauge 5 is unable to accurately measure the oil level.

Thus, the above-described conventional lubricating device can be applied only in the low and middle speed ranges in which the $D_mN$ value which designates the empirical speed limit of the roller bearing is at most 300,000 to 400,000 or less. $D_m$, shown in FIG. 1, is the average in mm of the inner and outer diameters of the bearing, and N is the rotational speed in RPM of the shaft.

SUMMARY OF THE INVENTION

This invention has been made in view of the disadvantages described above, and has for its object to provide a roller bearing lubricating device wherein a lubricating oil reservoir which dips a roller bearing is isolated from an oil tank, and the lubricating oil of the oil tank is caused to flow in a predetermined amount to the oil reservoir through an oil supply passage, whereby the temperature rise of the bearing can be lowered.

BRIEF DESCRIPTION OF THE DRAWINGS

In the drawings, the same symbols indicate the same or corresponding parts.

DESCRIPTION OF THE PREFERRED EMBODIMENT

Figure 1:
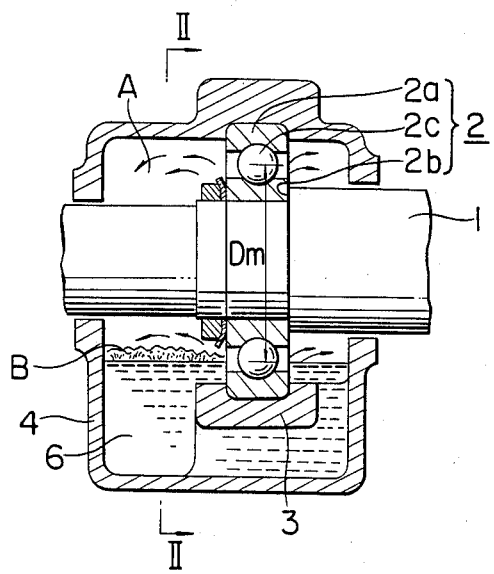
FIG. 1 is a longitudinal sectional view showing a conventional roller bearing lubricating device.
Figure 2:
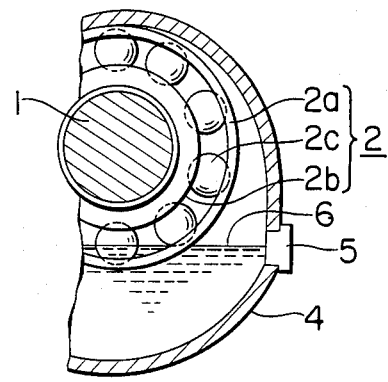
FIG. 2 is a transverse sectional view taken along the line II—II of FIG. 1.
Figure 3:
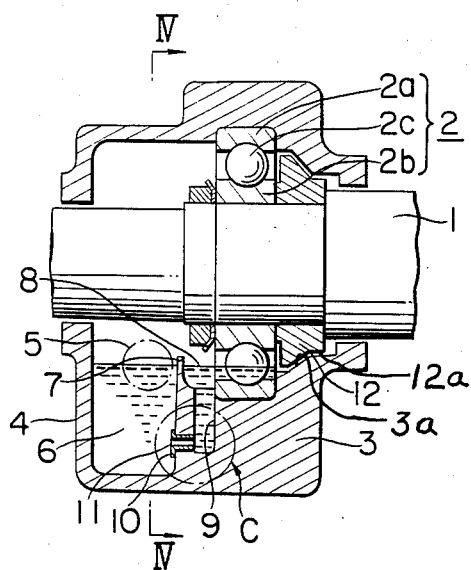
FIGS. 3 and 7 are longitudinal sectional views showing the roller bearing lubricating device according to one embodiment of the present invention, FIG. 3 showing the device in a stationary state and FIG. 7 showing the device in a rotating state.
Figure 4:
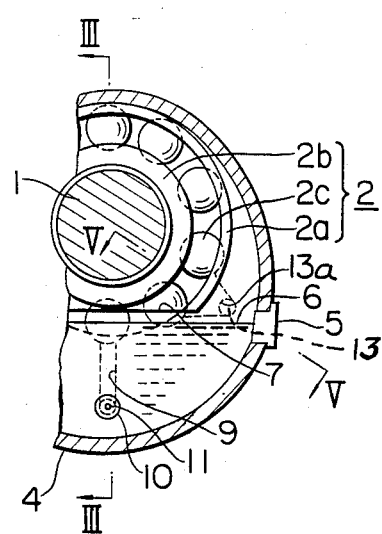
FIG. 4 is a sectional view taken along the line IV—IV of FIG. 3.
Figure 5:
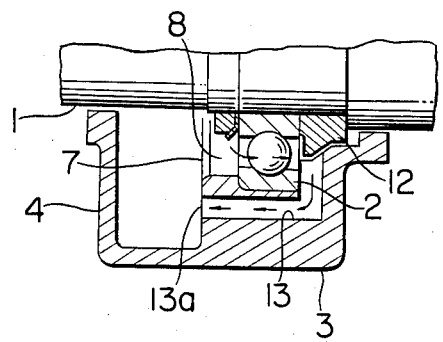
FIG. 5 is a sectional view taken along the line V—V of FIG. 4.
Figure 6:
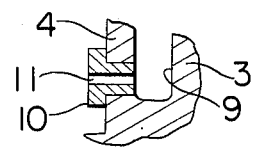
FIG. 6 is an enlarged view of portion C of FIG. 3.

An embodiment of the present invention will now be described with reference to FIGS. 3 to 6. FIG. 3 is a longitudinal sectional view showing the stationary state of a rotary shaft. FIG. 4 is a sectional view taken along the line IV—IV in FIG. 3. (FIG. 3 corresponds to the view taken along line III—III of FIG. 4). FIG. 5 is a sectional line taken along the line V—V of FIG. 4, and FIG. 6 is an enlarged view of portion C of FIG. 3.

Referring now to FIGS. 3 to 6, reference numeral 7 designates a weir formed in the bearing housing 3 for isolating the roller bearing 2 and the oil tank 4. The upper end of the weir 7 is formed slightly higher than the level of the oil gauge 5. An oil reservoir 8 formed by the weir 7 has a volume capable of reserving an amount of lubricating oil which is small when compared with the volume of the tank 4. An oil supply passage 9 passes through the lower part of the weir 7 and provides communication between the oil tank 4 and the reservoir 8. At the bottom end of the oil supply passageway 9 is an inlet which opens onto the oil tank 4. A liner 10 is detachably threaded into the inlet of the bottom of the passage 9 and has a predetermined diameter 11. An oil exhaust runner 12 is secured to the shaft 1. An oil exhaust passage 13, one end of which opens upon the runner 12 and the other end of which opens above the surface of the oil in the tank 4, is formed on each side of the bearings 2.

As shown in FIGS. 3 and 4, the tank 4 is filled with lubricating oil 6 so as not to overflow the weir 7 when the shaft 1 is stationary. Since the tank 4 and the reservoir 8 are partitioned by the weir 7, the bearing 2 is not immersed directly in the lubricating oil in the tank 4 and only a small portion of the outer race 2a and a plurality of rollers 2c are dipped in a small amount of lubricating oil of the reservoir 8 when the shaft 1 is stationary as described above.

Figure 7:
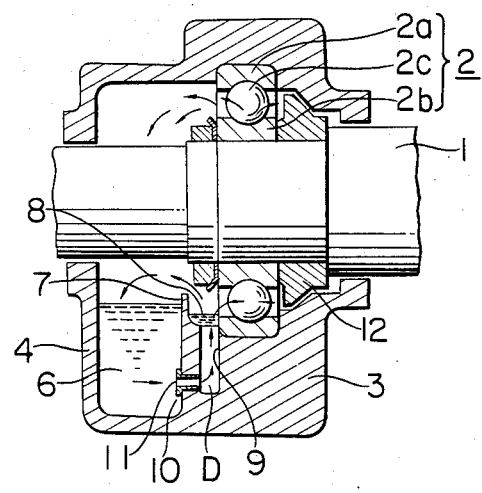

When the shaft 1 is rotated, the lubricating oil which lubricates the bearing 2 is radially splashed due to the rotation of the runner 12 as shown in FIG. 5, and exhausted through the passage 13 into the tank 4 from the opening 13a. The lubricating oil of the reservoir 8 is scattered due to the rotation of the bearing 2 as shown in FIG. 7, splashes over the upper end of the weir 7, and returns to the tank 4. As a result, there occurs a difference between the oil levels of the tank 4 and the reservoir 8, and the lubricating oil in the tank 4 is automatically supplied through the liner 10 and the passage 9 into the reservoir 8, as designated by the arrow D, due to the differential pressure thus produced, and the bearing 2 is lubricated to maintain sufficient oil level in reservoir 8 to cover only the lowermost part of the lowermost roller as illustrated in FIG. 7.

Figure 9:
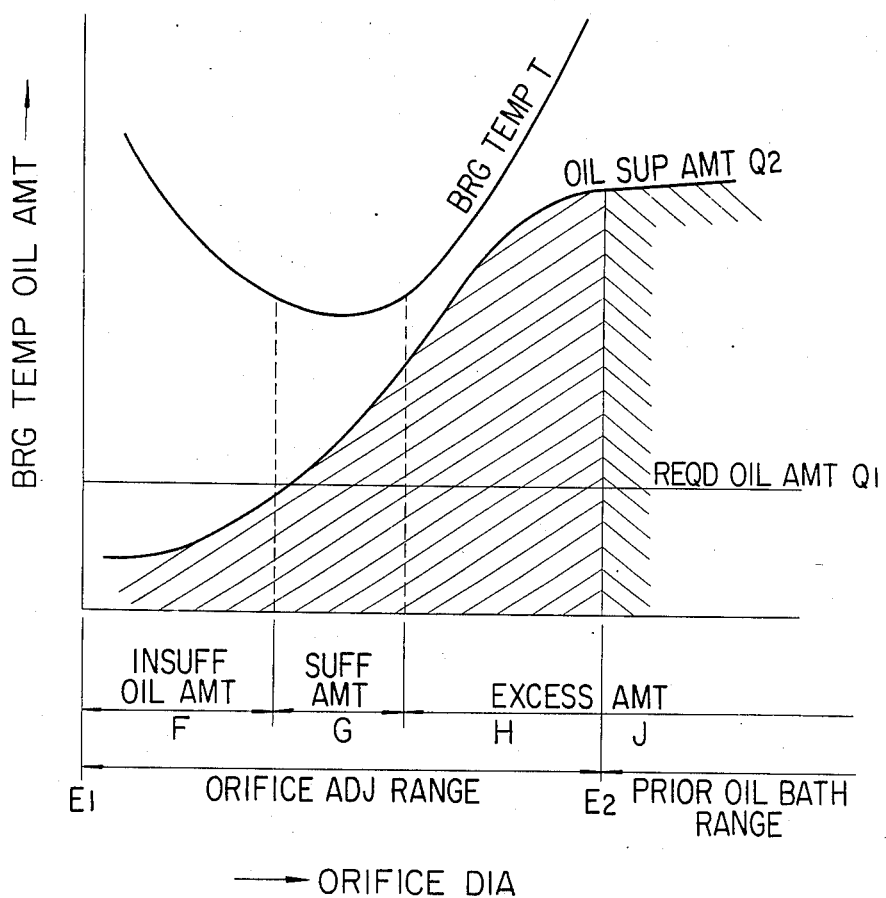
FIG. 9 is a diagram showing the relationship between the diameter of an orifice, the bearing oil supply amount, and the bearing temperature in the present invention.

FIG. 9 is a diagram showing the relationship between the oil amount supplied to the bearing and the bearing temperature, wherein the diameter 11 of the liner 10 is the abscissa and the bearing temperature and oil amount are the ordinate.

If the diameter 11 of the liner 10 is varied from $E_1$ to $E_2$ when a roller bearing of a predetermined size is rotated at a predetermined rate, if the diameter 11 of the liner 10 is small, the oil supply amount $Q_2$ is less than the minimum amount $Q_1$ necessary to cool the bearing as designated by the range F, with the result that the bearing temperature T rises. On the contrary, if the diameter 11 of the liner 10 is excessively large, the oil supply amount $Q_2$ becomes excessive as designated by the range H, with the result that the bearing temperature T becomes high due to the stirring of excess oil. In the range J of a conventional oil bath lubricating structure, the bearing temperature T abruptly rises due to the excess lubricating oil.

When the diameter 11 of the liner 10 is within the range designated by G, the oil supply amount $Q_2$ is appropriate, with the result that the bearing temperature T decreases. From experiments using a bearing of a predetermined size, it is known that when the diameter 11 of the liner 10 is from 3 to 6 mm, the roller bearing lubricating device can be applied in a high speed range in which the $D_mN$ value of the roller bearing is 500,000 to 800,000.

Since oil stirring is almost eliminated in the above-described lubricating device, oil splashing can be reduced, thereby preventing oil leakage. Further, since the oil reservoir and the oil tank are partitioned by the weir, surface waves in the oil and variations in the oil level can be substantially eliminated with the result that a normal oil level indication can be obtained with an oil gauge.

Figure 8:
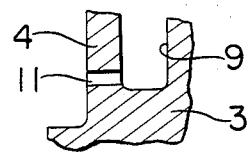
FIG. 8 is a sectional view showing another embodiment of the invention.

In the embodiment described above, a liner 10 is provided in the inlet at the bottom of the oil supply passage 9. However, the liner 10 may be dispensed with (eliminated), as shown in FIG. 8, in which case the predetermined diameter 11 becomes the diameter of the inlet of the bottom of the passageway 9.

Thus, it will be appreciated that according to the present invention since the oil reservoir and the oil tank in which the roller bearing is partly dipped are isolated by the weir and communication between the tank and the reservoir is through an oil supply passage, a part of which has a predetermined cross-sectional area, a predetermined amount of lubricating oil is supplied from the tank to the reservoir. Since excess oil is not supplied to the bearing, the temperature rise in the bearing can be decreased.

What is claimed is:

1. A roller bearing lubricating device, comprising:
   a roller bearing, including an outer race, an inner race inside said outer race and roller means between said inner and outer races, formed in a vertical plane for supporting a rotary shaft having a horizontally extending longitudinal axis, for rotation about said longitudinal axis;
   a bearing housing supporting said bearing and defining an open space therein surrounding said rotary shaft;
   a weir having a vertically extending outer wall in a lower portion of said open space on one axial side of said roller bearing, forming therein an oil reservoir on one side of said outer wall such that a lowermost portion of the lowermost roller means is dipped in lubricating oil in the oil reservoir, and defining an oil tank in said lower portion of said open space outside said weir;
   an oil supply passage in said weir, said oil tank and said oil reservoir communicating with each other through said oil supply passage, said oil supply passage having a predetermined minimum cross-sectional area;
   means, including an oil exhaust runner of predetermined diameter formed on said rotary shaft for rotation therewith along the axial side of said bearing opposite said one axial side with the radially outer periphery of said exhaust runner above the level of the lubricating oil in said oil reservoir, for drawing lubricating oil from said roller bearing and splashing the lubricating oil drawn from the roller bearing centrifically of said exhaust runner; and
   means, including an exhaust passage of minimum cross-sectional area greater than the minimum cross-sectional area of said oil supply passage, having one end opening in the centrifical direction of said runner and the other end opening out of a side wall of said oil tank above said oil level, for directing the lubricating oil splashed by said drawing and splashing means into said oil tank, whereby during rotation of said rotary shaft and oil exhaust runner therewith lubricating oil in said oil tank is drawn by differential pressure into said oil reservoir through said oil supply passage and the level of lubricating oil stored in said oil reservoir is maintained along the lowermost portion of the lowermost roller means.

2. A roller bearing lubricating device as in claim 1, wherein said minimum cross-sectional area is selected so as to minimize the temperature of the lubricating oil during high speed rotation of the rotary shaft.

3. A roller bearing lubricating device as in claim 2, wherein said oil supply passage has a diameter in the range of 3 to 6 mm.

4. A roller bearing lubricating device as in claim 1, wherein said exhaust passage, including said one end opening and said other end opening, is formed in and extending through said bearing housing.

5. A roller bearing lubricating device as in claim 4, wherein said one end opening is located on said axial side of said bearing opposite said one axial side.

6. A roller bearing lubricating device as in claim 1, wherein said one end opening is located on said axial side of said bearing opposite said one axial side.

7. A roller bearing as in claim 1, wherein said oil exhaust runner is axially spaced from said reservoir and comprises means for directing oil scattered by said roller bearing to said tank via said exhaust passage without agitating the oil in said tank and without agitating the oil in said reservoir.

8. A roller bearing as in claim 1, wherein said roller bearing forms the only element of said device which agitates the oil therein.

* * * * *